Patented July 25, 1933

1,919,718

UNITED STATES PATENT OFFICE

HAROLD GRAY, OF AKRON, OHIO, ASSIGNOR TO THE B. F. GOODRICH COMPANY, OF NEW YORK, N. Y., A CORPORATION OF NEW YORK

METHOD AND MEANS FOR ADHERING RUBBER TO METAL

No Drawing.　　Application filed March 25, 1930.　Serial No. 438,914.

This invention relates to composite products consisting of rubber or the like and a relatively rigid material, and particularly to composite products composed of soft vulcanized rubber adhering firmly to a ferrous metal.

This application is a continuation in part of my copending application, Serial No. 185,919, filed April 22, 1927, now Patent 1,774,324.

This invention is based on the fact that when certain metallic salts are interposed between a metal and a layer of vulcanizable rubber, and the rubber vulcanized, the rubber and the metal are caused to adhere very firmly to one another.

The metallic salts which are employed for the purpose of this invention include the salts of metals having more than one valency, that is, metals capable of combining with acid radicals in two or more different ratios, particularly copper, cobalt, manganese, iron, and lead; with organic acids, particularly fatty acids of high molecular weight. Such compounds in which the acid grouping is that of a non-volatile fatty acid are ordinarily termed soaps, and will hereinafter be so designated.

This invention is carried out by cleaning the metallic surfaces which are to be coated, all grease, rust and scale being removed, applying a thin uniform layer of the salt, either alone, or dissolved in a solvent or in a rubber cement. Certain of the salts or soaps, for example copper oleate, are sufficiently soft that they may be spread directly on the surface of the metal, but is ordinarily preferred to dissolve the salt in a volatile solvent or in a solution of rubber in a volatile solvent. The solution containing the salt is then applied in a thin uniform layer on the surface of the metal, for example, by painting or spraying, and the solvent is evaporated. If the salt has not previously been admixed with rubber by dissolving it in a solution of rubber it is preferred to apply a vulcanizable rubber cement over the salt film on the metal. The rubber layer which is to be adhered to the metal is then applied and is vulcanized in contact therewith, preferably under pressure as in a press or in a pressure vulcanizer. The salt or the salt-containing layer may, under some circumstances, be applied to the rubber instead of the metal, but it is ordinarily preferred to carry out the invention as described above.

*Example 1.*—A rubber cement is prepared by mixing rubber 100 parts by weight, zinc oxide 150 parts, carbon black 25 parts, sulphur 5 parts, organic accelerator ½ part, and cobalt stearate 5 parts, and dissolving the mixture in about three times its weight of gasoline. A uniform layer of the cement is applied on a sand blasted steel sheet, and after the evaporation of the solvent a slab of unvulcanized rubber with a stout fabric backing is placed on the coated metal with the fabric on the outside, and the whole is vulcanized between the steam-heated platens of a hydraulic press. The vulcanized rubber adheres to the metal very firmly, the order of adhesion being at least ten times that secured with the corresponding cement without the cobalt soap.

The same cement similarly employed after it has been agitated for ten days in contact with the air exhibits an adhesion of such a high order that the rubber cannot be detached from the metal at all, the rubber itself tearing rather than separating from the metal.

*Example 2.*—A solution of copper linoleate in benzene is sprayed on a clean, bright steel surface until the metal is covered with a thin uniform layer of the soap. A rubber cement is then applied, followed by a layer of unvulcanized rubber. The structure is permanently united by vulcanization under pressure, the vulcanized rubber adhering with extraordinary tenacity to the steel.

*Example 3.*—A rubber cement is prepared as in Example 1 above, except that 5 parts of cobalt acetate are substituted for the cobalt stearate. A slab of rubber vulcanized in contact with a sheet of steel coated with this cement adheres so firmly that the rubber cannot be detached from the metal.

*Example 4.*—A sheet of brass is cleaned and is coated with a vulcanizable rubber cement containing 3 parts of copper resinate for each 100 parts of rubber. A layer of rubber is vulcanized in contact with the coated metal, and is found to adhere thereto tenaciously and permanently.

The reason for the peculiar efficacy of the metallic salts or soaps of the class described above is not well understood. It is believed, however, that it bears some relation to the oxidation of the rubber, since it is found that the degree of adhesion attained is increased by mixing the soap with the rubber cement some time before the mixture is employed, and allowing it to come in effective contact with the oxygen of the air. This view is confirmed by the fact that those soaps which are most effective in the practice of this invention are known to be active catalysts of oxidation.

As is pointed out above, the preferred compounds are the salts of metals having more than one valency, with the naturally occurring fatty acids of high molecular weight, such as stearic, palmitic, margaric, oleic, linoleic, ricinoleic and lauric acids and the resin acids such as abietic acid, that is to say, soaps of these metals. The soaps of copper, cobalt, and manganese, particularly the first two, appear to give the best results. The invention, however, is by no means limited to these specific compounds, for others falling within the class defined are likewise operative in securing the adhesion of rubber to metals. Fatty acids of low molecular weight such as acetic, butyric, oxalic, and succinic acids may be employed to form the salts with these metals, or even aromatic acids such as benzoic acid or organic acids of a different molecular configuration, owing their acidity to other groupings than the carboxyl group.

The salts may be prepared by any conventional method, for example by reacting a salt or oxide of the metal with the free organic acid or with an ester or salt of the acid. One of the most convenient methods has been to heat a compound of the metal with an excess of an oil containing the fatty acid in combination. The soap which is formed is then retained in solution in the excess of oil, the presence of the uncombined oil in the adhesive composition not usually being objectionable if it is not present in too large a proportion.

It is to be understood that the specific methods hereinabove described are only illustrative and that numerous other modifications are possible within the spirit and scope of this invention. It is therefore not intended to limit this invention except as may be required by the prior art and as indicated in the appended claims.

I claim:

1. The method of adhering rubber to metal which comprises interposing between the rubber and the metal a thin layer of a composition comprising a salt of an organic acid with manganese, and uniting the parts by vulcanization.

2. The method of adhering rubber to a ferrous metal which comprises interposing between the rubber and the metal a composition comprising a soap of manganese, and uniting the parts by vulcanization.

3. The method of adhering rubber to a ferrous metal which comprises dissolving a salt of an organic acid with manganese in a rubber cement, interposing a layer of the cement between the rubber and the metal, and uniting the parts by vulcanization.

4. The method of adhering rubber to a ferrous metal which comprises dissolving a soap of manganese in a rubber cement, exposing the cement to the action of oxygen, interposing a layer of the cement between the rubber and the metal, and uniting the parts by vulcanization.

5. The method of adhering rubber to a ferrous metal which comprises coating the metal with a thin, uniform layer of a composition comprising a salt of an organic acid with manganese, applying a layer of vulcanizable rubber, and vulcanizing the assemblage at an elevated temperature and pressure.

6. An adhesive composition for bonding rubber to metal comprising a salt of an organic acid with manganese.

7. An adhesive composition for bonding rubber to metal comprising a solution of a soap of manganese in a volatile solvent.

8. An adhesive composition for bonding rubber to metal comprising rubber and a salt of an organic acid with manganese.

9. An adhesive composition for bonding rubber to metal comprising a partially oxidized solution of rubber and a salt of an organic acid with manganese, in a volatile solvent.

HAROLD GRAY.